June 3, 1930.  H. A. S. HOWARTH  1,760,904
BEARING
Filed April 12, 1927  7 Sheets-Sheet 5

Inventor
Harry A. S. Howarth
By Cameron, Kerkam & Sutton
Attorneys

June 3, 1930.   H. A. S. HOWARTH   1,760,904
BEARING
Filed April 12, 1927   7 Sheets-Sheet 6

Inventor
Harry A. S. Howarth
By
Cameron, Kerkam & Sutton
Attorneys

June 3, 1930.  H. A. S. HOWARTH  1,760,904
BEARING
Filed April 12, 1927   7 Sheets-Sheet 7

Fig. 15.

Inventor
Harry A. S. Howarth
By Cameron, Kerkam & Sutton
Attorneys

Patented June 3, 1930

1,760,904

UNITED STATES PATENT OFFICE

HARRY A. S. HOWARTH, OF PHILADELPHIA, PENNSYLVANIA, ASSIGNOR TO KINGSBURY MACHINE WORKS, INC., OF PHILADELPHIA, PENNSYLVANIA, A CORPORATION OF DELAWARE

BEARING

Application filed April 12, 1927. Serial No. 183,135.

This invention relates to bearings, and more particularly to combined thrust and steady bearings, although certain features thereof are applicable to journal bearings generally.

It has heretofore been the practice, in combined thrust and steady bearings, to support the steady bearing in one way or another from the pot or housing which surrounds the thrust bearing. This has necessitated that the mounting for the steady bearing be dependent upon the size and shape of said pot or housing, and inasmuch as the size and shape of the latter vary within wide limits depending upon the service to which the bearing is put, the character of oil cooling employed, the size and speed of bearing, etc., and as it is also common for the pot or housing to be furnished by a different manufacturer than that of the thrust bearing and the steady bearing, it has been impossible to standardize steady bearing supports with the thrust bearings with which they are associated.

It is an object of this invention to provide a combined thrust and steady bearing wherein the support for the steady bearing is entirely independent of the size and shape of the pot or bearing housing, but is determined by the size of the thrust bearing, so that the steady bearing support may be standardized, and the thrust bearing and the steady bearing may be furnished as a unit by the bearing manufacturer.

Another object of this invention is to provide a novel steady bearing support whereby the steady bearing may be made self-aligning, if desired.

Another object of this invention is to provide a novel combined thrust and steady bearing as herein characterized wherein the lubrication of the steady bearing is effected from the oil provided for lubricating the thrust bearing.

Another object of this invention is to provide a combined thrust and steady bearing with novel arrangements for effecting the lubrication of the steady bearing from the oil provided for the lubrication of the thrust bearing and wherein the means for effecting such lubrication may be variously disposed with respect to the steady bearing and the thrust bearing.

Another object of this invention is to provide a steady bearing with means for insuring a capillary film of oil between the bearing surfaces when the parts are stationary.

Another object of this invention is to provide a combined thrust and steady bearing in which the thrust and steady bearing elements are associated in unitary relationship and in which the steady bearing may be within or below the thrust bearing as well as above the same.

Another object of this invetnion is to provide a combined thrust and steady bearing with novel arrangements for effecting the lubrication of the steady bearing from the oil provided for the lubrication of the thrust bearing and wherein the means for effecting such lubrication may be disposed below as well as in or above the thrust bearing.

Another object of this invention is to provide a combined thrust and steady bearing as heretofore characterized which may be air cooled or water cooled as desired.

Another object of this invention is to provide a combined thrust and steady bearing which enables the use of a stationary thrust collar.

Another object of this invention is to provide a combined thrust and steady bearing with novel means for enabling the steady bearing to be self-aligning or with novel means for effecting the alignment of the steady bearing.

Another object of this invention is to provide a steady bearing or other forms of journal bearing with a novel arrangement of oil grooves whereby the drawing of air into the oil films may be prevented, or whereby the oil films produced may be so disposed as to maintain the desired balance of the oil films axially of the bearing, or whereby vibration of the shaft may be prevented, or controlled, or whereby a combination of these results may be obtained if desired.

Another object of this invention is to provide a combined thrust and steady bearing wherein the steady bearing is self-aligning and provided with oil grooves which maintain the desired balance of the oil films with respect to the axis about which alignment is effected.

Another object of this invention is to provide a combined thrust and steady bearing which is possessed of any desired combination of the features above referred to.

Other objects will appear as the description of this invention proceeds.

The invention is capable of receiving a variety of mechanical expressions, several of which are shown on the accompanying drawings, but it is to be expressly understood that the drawings are for purposes of illustration only and are not to be construed as a definition of the limits of the invention, reference being had to the appended claims for that purpose.

Referring to the drawings, wherein the same reference characters are employed to designate corresponding parts in the several figures.

Figure 1:
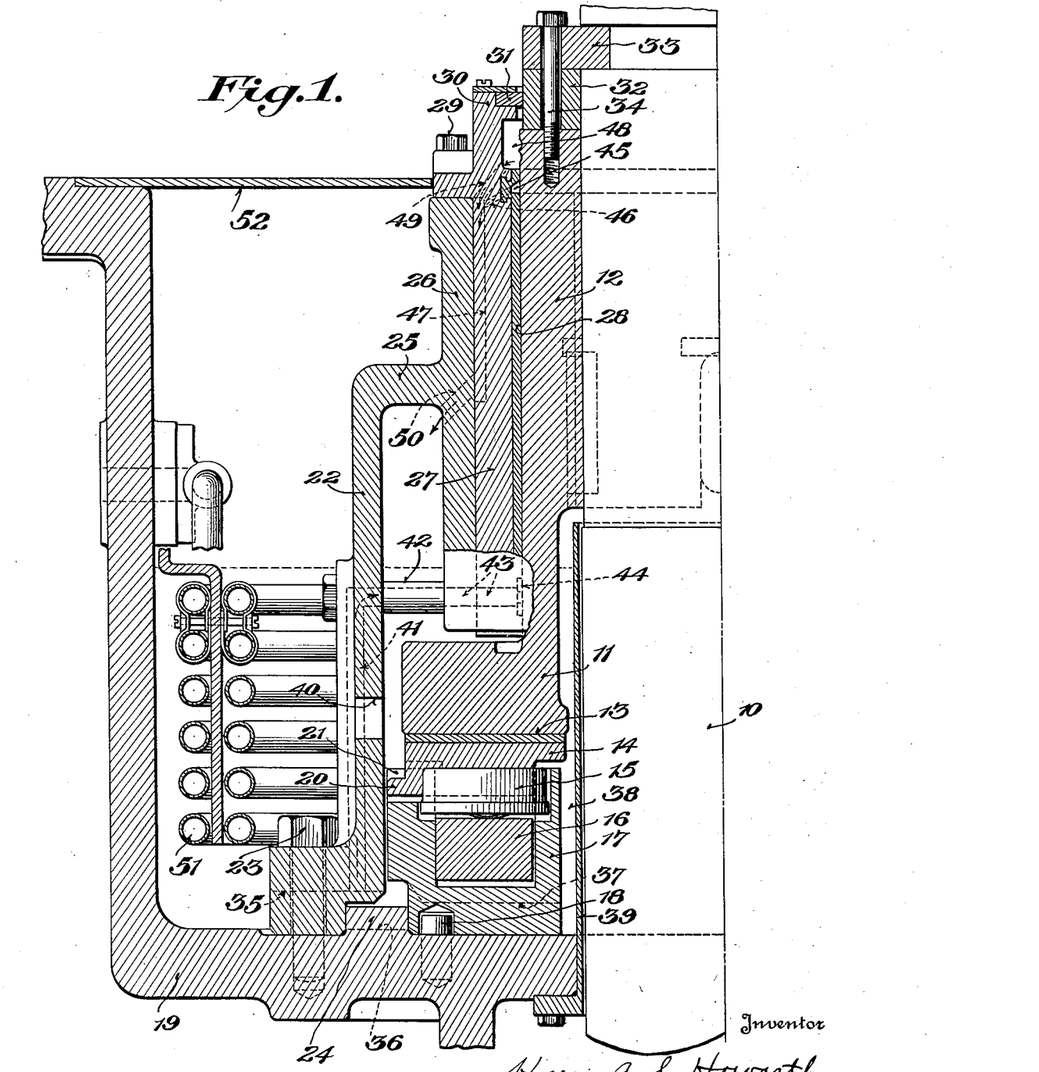
Fig. 1 is a half axial section of a combined thrust and steady bearing embodying the present invention.
Figure 2:
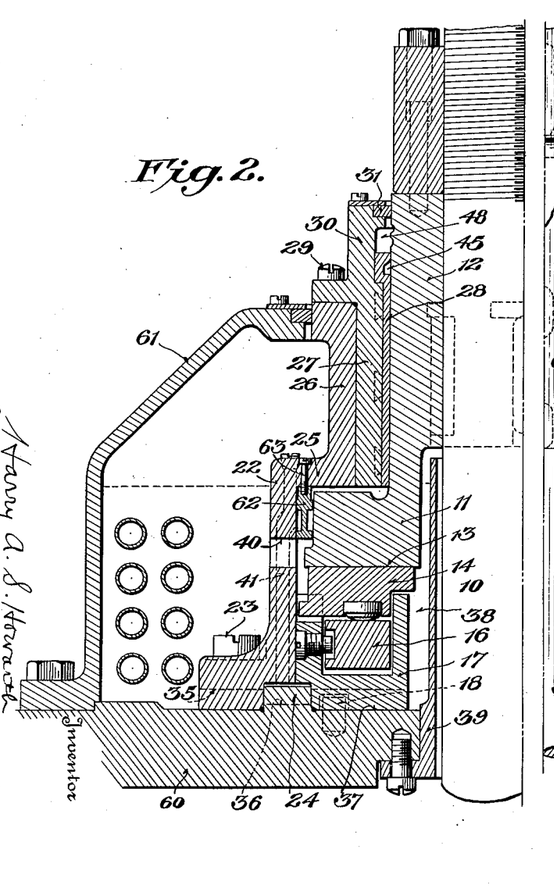
Fig. 2 is a half axial section of another embodiment of the present invention.
Figure 3:
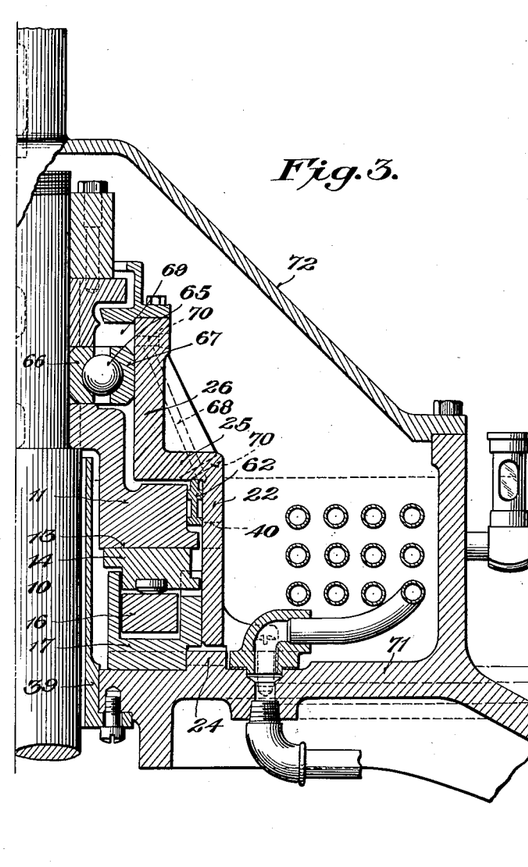
Fig. 3 is a half axial section of another embodiment of the present invention.

In the form shown in Fig. 1, shaft 10 has mounted thereon, and secured thereto in any suitable way, a thrust collar 11 provided, integrally therewith or suitably attached thereto, with an elongated cylindrical extension 12 to constitute the rotatable member of the steady bearing. Cooperating with the bearing face 13 of the thrust collar 11 is the stationary member of a thrust bearing of any suitable construction, but preferably composed of a plurality of bearing segments or shoes 14 suitably mounted to tilt circumferentially of the axis of the bearing, to form wedge-shaped oil films between the bearing surfaces of said segments and the collar, and also preferably to tilt radially of the axis of the bearing, to maintain proper bearing engagement throughout the radial width of said bearing surfaces. As illustrated the bearing segments or shoes 14 are mounted on pressure-distributing blocks 15, or carry inserts as shown in Figs. 2 and 3, and are tiltably mounted on equalizing means of any suitable construction, shown as a bridged series of equalizing plates 16 retained within a channel-shaped base ring 17 suitably held against rotation, as by dowel pins 18 projecting from the base or bottom of the pot or oil well 19. Rotation of the bearing segments is prevented by the engagement of radial projections 20 thereon with axial projections 21 on the channel-shaped base ring 17, although other forms of equalizing means may be employed as shown in some of the other embodiments. In place of bearing segments of the type illustrated, however, the bearing segments may be continuous or semi-continuous, or they may form the parts of a flexible or inflexible bearing ring, or they may be replaced by any other suitable form of stationary thrust bearing member. So also any other suitable form of support or mounting for the stationary bearing member or its elements may be provided, the details of the thrust bearing per se forming no part of the present invention.

In conformity with the present invention the steady bearing associated with the cylindrical extension 12 of the thrust collar 11 is mounted in unitary relationship with the thrust bearing elements and the support for the steady bearing elements is rendered independent of the size and shape of the pot 19, being preferably determined by the size of the thrust bearing, as shown. In the form illustrated in Fig. 1, a generally cylindrical casing 22, which may be continuous or more or less interrupted in a circumferential direction, is mounted on the base or bottom of the pot 19 in any suitable way, being shown as attached thereto by bolts or screws 23. Said casing 22 is preferably centered with respect to the shaft, and to this end the bottom of the pot 19 is shown as provided with a circumferential rib 24, integral therewith or suitably attached thereto, to cooperate with the inside periphery of the inner extremity of the casing 22.

At its opposite extremity the casing 22 is provided with an angularly and inwardly directed portion 25, shown as extending at substantially a right angle to the axis of the casing 22, although this is not essential, said portion 25 being connected to or integrally formed with a cylindrical sleeve-like support 26 which carries the shell 27 of the steady bearing whose Babbitt facing is indicated at 28. Said shell 27 may be secured to the support 26 in any suitable way, as by bolts or screws 29, and is shown as having an axial extension 30 which carries an oil retaining ring 31 of felt although it might be a floating metal ring. An adjustment ring 32 is shown as interposed between the extremity of the thrust block 11, 12 and a retaining ring key 33 carried in a groove in the shaft 10, so that by varying the thickness of the ring 32, or by the interposition of shims, the shaft may be adjusted in the direction of its axis with respect to the plane of the thrust surface 13, screws 34 being shown as passed through the rings 33 and 32 and threaded into the extremity of the thrust block 11, 12.

When it is desired that the steady bearing shall be self-aligning with respect to the shaft the inwardly and angularly directed portion 25 of the casing 22 may be made of such dimensions as to possess the requisite elasticity to enable the support 26, with the stationary bearing member carried thereby, to properly align themseles with the axis of the shaft. The elasticity of the portion or neck 25 therefore renders the steady bearing self-aligning, and when this feature is employed, the bearing members of the steady bearing are preferably provided with oil grooves such as to maintain the desired balance between the various portions of the oil film with respect to the radial plane of said elastic support 25, as hereinafter explained.

The steady bearing is preferably provided with oil from the body of oil normally maintained in and circulating through the pot or oil well 19 for the lubrication of the thrust bearing. The oil circulation through the parts of the thrust bearing is maintained in any suitable way. In the form shown, the base of the casing 22, the circumferential ring 24 and the base of the channel-shaped ring 17 are provided with suitably aligned slots or apertures 35, 36 and 37 respectively, so that oil may flow radially inward adjacent the bottom of the pot from the surrounding body of oil in the pot to the axially directed channel 38 between the inner periphery of the stationary thrust bearing member and the stationary oil retaining tube 39 suitably secured to the pot within the shaft aperture thereof. The oil flowing axially through the passage 38 flows radially outward through the oil grooves of the stationary thrust bearing member, or between the bearing segments 14, to form the oil films between the thrust bearing surfaces, returning to the body of oil in the pot or oil well through apertures 40 provided in the casing 22.

The oil for lubricating the steady bearing is preferably derived from this circulating oil and to this end the casing 22 is shown as provided with suitable channels and oil pumping means to effect a circulation of oil from the oil in the oil well to the bearing surfaces of the steady bearing. As shown, the casing 22 is provided with one or more axially directed passages 41 each of which opens at one end into one of the slots or apertures 35 and at its opposite end communicates through pipe 42, interposed between the casing 22 and the support 26, with aligned passages 43 in the support 26 and shell 27, which passages lead to one or more suitable grooves 44 in the babbitt 28 constituting a viscosity pump. It is to be expressly understood, however, that any other suitable form of pump may be employed in this and other embodiments of this invention. The babbitt 28 is provided with oil grooves of any suitable character, as hereinafter explained more in detail, whereby the oil pumped upwardly by the viscosity pump 44 is supplied to the bearing surfaces of the steady bearing, and at its upper extremity the babbitt 28 contains an oil collecting and air sealing groove 45 which communicates through one or more suitable outlet apertures 46 with one or more return passages 47 in the shell 27. The upper extremity of the shell 27 is also preferably provided with an oil collecting chamber 48 which communicates through one or more passages 49 with the return passages 47. The return passages 47 communicate with a passage 50 through the support 26 whereby the oil is returned to the oil well within the chamber between the casing 22 and the support 26. The quantity of oil circulated to and through the steady bearing is controlled by the number, size, shape and arrangement of the passages, as hereinafter explained.

In the form shown, a cooling coil 51 is mounted within the pot to effect the proper cooling of the oil as it returns from the thrust bearing and the steady bearing surfaces before it is again drawn into the passages 35, 36, 37. In the structure illustrated, the cooling coil is supported by the pot 19, but it could with equal facility be supported by the casing 22 if desired. The top of the pot or oil well is shown as closed by a cover plate 52 of any suitable type and attached to the pot in any suitable way.

In the form shown in Fig. 2, the steady bearing is again mounted in unitary relationship with the thrust bearing and is supported by a generally cylindrical casing 22 which surrounds the thrust bearing elements. A generally cylindrical support 26, which carries the steady bearing shell 27, is connected to the casing 22 by an inwardly and angularly directed portion 25. The casing 22 is shown as bolted to the deck or base 60 to which is also bolted the pot or bearing housing 61.

In this construction the viscosity pump is provided by a pump ring 62 which cooperates with the outer periphery of the thrust collar 11 to build up an oil pressure in the pump grooves and force it to the steady bearing. This ring also forms a seal at the periphery of the thrust collar and prevents mixture of air with the oil thereat. The ring 62 is carried in any suitable way, as by screws 63, from the casing 22. As in the embodiment of Fig. 1, the casing 22 is provided with one or more passages 41 leading to the viscosity pump 62, and the oil is delivered to the inner end of the steady bearing through a suitable passage (not shown). The oil is returned to the oil well from groove 45 and chamber 48 through suitable passages not shown. The cooling coil 51 is carried by the deck 60.

In the form shown in Fig. 3, an embodiment of the present invention analogous to that of Fig. 2 is illustrated, but this embodiment employs a ball steady bearing 65 instead of a surface steady bearing. A rotatable raceway 66 is carried by the shaft above the thrust block 11, and a stationary raceway 67 is carried by the support 26, which support is attached to the casing 22 by an inwardly and angularly directed portion 25. As in the embodiment of Fig. 2, the viscosity pump is provided by a ring 62 cooperating with the outer periphery of the thrust collar 11 and carried by the casing 22. The ring 62 thus forms an air seal and delivers air-free oil to the ball bearing 65 through the passage 68. The oil flows through the ball bearing from a chamber 69 above the same and returns to the oil well through one or more suitable passages 70 formed in the casing 22. In this embodiment the outer wall of the oil well is illustrated as formed integrally with the deck 71 and carries suitably attached thereto a cover 72 which encloses the end of the shaft 10.

Figure 4:
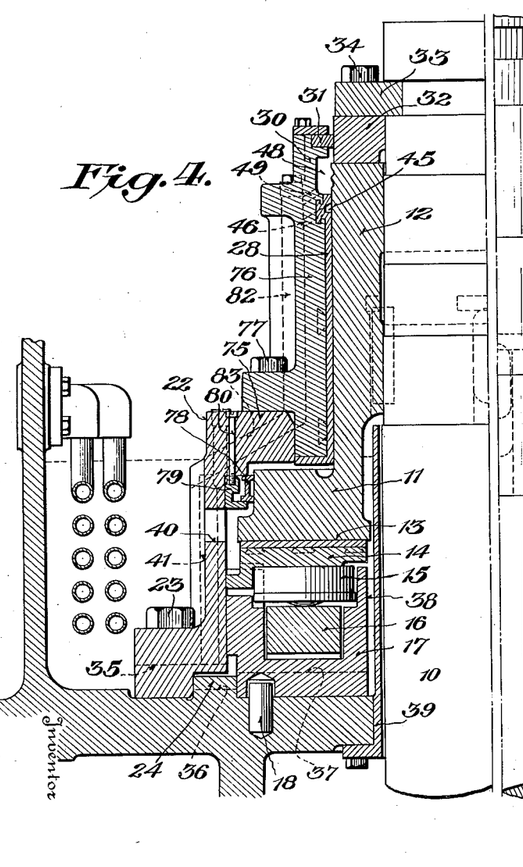
Fig. 4 is a half axial section of another embodiment of the present invention.

In the form shown in Fig. 4, which in many respects is similar to that shown in Fig. 1, the support for the steady bearing takes the form of a generally cylindrical casing 22 provided at its upper end with an inwardly directed flange 75 to which the shell 76 of the steady bearing is directly but detachably attached in any suitable way, as by bolts or screws 77, or it could be made integral therewith. In this construction the steady bearing is not self-aligning. The viscosity pump is here shown as composed of a ring 78 which closely embraces the periphery of the thrust collar and which may move radially with respect to its supporting ring 79 mounted on casing 22 by screws 80, a desirable construction where the pumping ring fits the periphery of the thrust collar more closely than the extension 12 of the thrust block fits within the Babbitt lining 28 of the steady bearing.

As in the prior embodiments, the viscosity pump is supplied with oil through one or more passages 41 in the casing 22, and delivers it to the inner end of the steady bearing through one or more passages (not shown). The shell 76 is also provided interiorly thereof with one or more passages 82 for returning the oil from the passages 47 and 49, which communicate with the air sealing oil groove 45 and chamber 48, to one or more discharge passages 83 formed in the casing 22.

Figure 5:
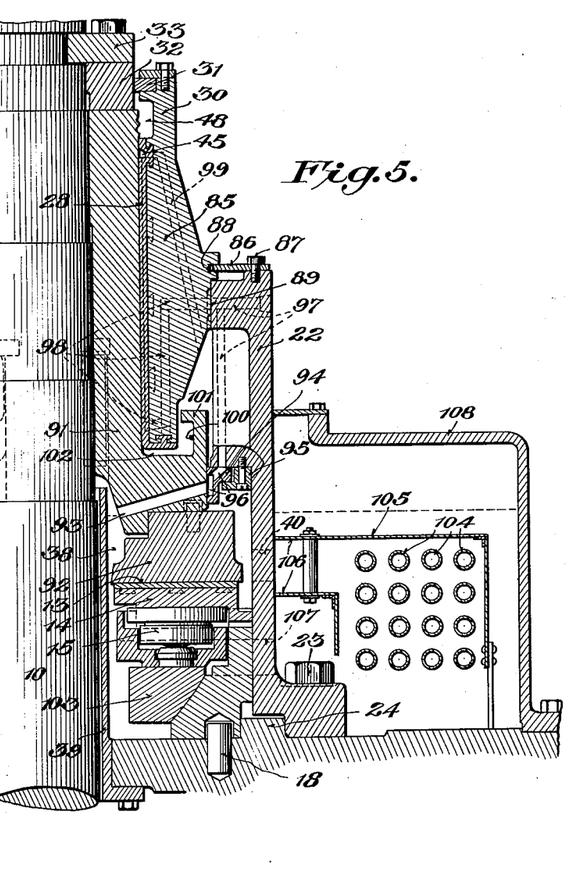
Fig. 5 is a half axial section of another embodiment of the present invention.

In the form shown in Fig. 5, the support for the steady bearing again takes the form of a generally cylindrical casing 22, but in this construction the sleeve 85 which constitutes the shell for the steady bearing is vertically supported elastically from the extremity of the casing 22 by an elastic ring 86 suitably attached to a casing 22, as by screws 87, and suitably attached to the shell 85 as by engagement in a groove 88 therein. The shell 85 is centered in the aperture in the upper end of the casing 22, but has sufficient clearance therewith to enable the shell 85 to align itself with the axis of the shaft by flexure of the ring 86. The surfaces 89 between the shell 85 and the casing 22 may be made generally cylindrical as illustrated, or they may be made spherical, or one may be cylindrical and the other spherical to increase the freedom of movement, as hereinafter explained in conjunction with another embodiment of this invention.

In this form, the thrust block 91 is made separate from and suitably attached to the runner 92, and is provided with one or more passages 93 which lead from the channel 38 at the inner periphery thereof. A radially adjustable ring 94, carried by a stationary ring 95 supported from the casing 22, and having passages 96 therein, is adapted to receive the oil from the passages 93 and deliver it to passages 97 suitably formed in casing 22 and leading to passages 98 formed in the shell 85, by which the oil is delivered to the inner lower end of the steady bearing surfaces. The inner end of the passages 93 take oil from the passage 38 and by centrifugal action deliver the oil to the ring 94, from which it flows through the passages 97 and 98 to the steady bearing surfaces, a return passage being indicated at 99, and passages (not shown) lead out into the reservoir through casing 22 below the upper horizontal wall of the reservoir. As in embodiments previously described, the periphery of the rotatable bearing members may be provided with suitable air sealing means.

In this embodiment the thrust block 91 is provided with a channel 100 which embraces the lower extremity of the steady bearing shell 85, and the outer extremity of said channel is provided with an overhanging flange 101. When the thrust block is rotating and the oil is being supplied to the steady bearing surfaces through the passages 97 and 98, some of the oil will collect in the channel 100 and be thrown by centrifugal action against the outer wall of said channel, the overhanging flange 101 preventing the escape from this channel of a certain amount of the oil. When the shaft is at rest, the oil in the channel 100 collects in the bottom of said channel, and seals the lower end of the bearing clearances at 102 between the bearing surfaces of the steady bearing. Hence oil will rise between said bearing surfaces by capillary action and thereby maintain oil between said bearing surfaces when the parts are at rest and facilitate the starting of the bearing.

In the form shown in Fig. 5 the stationary thrust bearing member is mounted on a ball and socket equalizing ring 103. The cooling coil 104 may be provided with a housing 105 to direct the circulating oil into intimate contact therewith, and the inlet to said housing, which communicates with the apertures 40 in the casing 22, is shown as formed by spaced baffles 106 which may cooperate with the periphery of the casing 22 to center the housing 105. It will be noted that the oil which returns to the reservoir through the suitably formed apertures 40 induces a whirling motion in the oil in the reservoir, thus increasing the effectiveness of the cooling coil. It will also be noted that owing to the proximity of the apertures 40 to the periphery of the rotatable bearing member and the direction of oil movement induced by the rotatable bearing member, a vigorous circulation of oil is produced exteriorly of the housing 22 that will render the cooling coil reasonably effective even though the housing 105 be omitted in whole or in part. One or more passages for the flow of oil from the oil well to the inner side of the thrust bearing members are indicated at 107. The bearing housing 108 is thus entirely independent of the cooling coil and its housing as well as the parts of the thrust and steady bearings and the supports for the elements thereof. The cylindrical shape of casing 22 allows the housings 105 and 108, the latter of which may be of any suitable construction, to be assembled by simply sliding them endwise into place without the necessity of forming them in halves.

Figure 6:
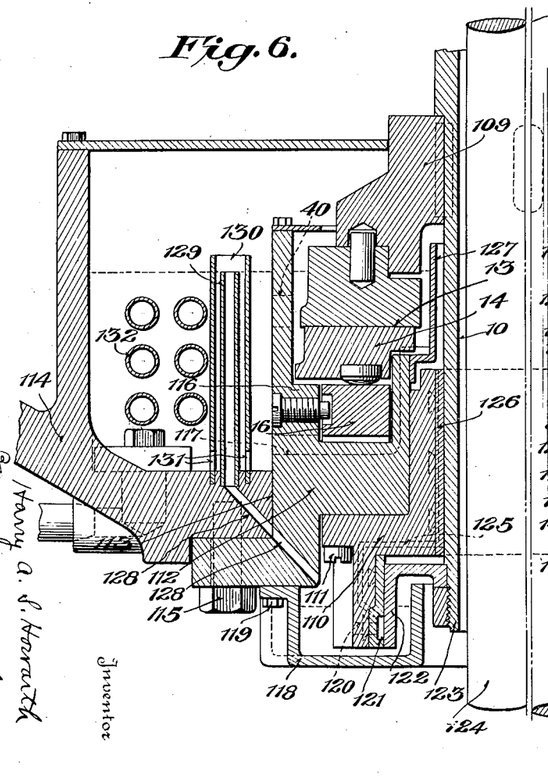
Fig. 6 is a half axial section of another embodiment of the present invention.

In the form shown in Fig. 6 an embodiment of the present invention is illustrated wherein the thrust and steady bearing members are not positioned at the upper extremity of the shaft. In this embodiment the hollow shaft 10 carries in any suitable way a rotatable thrust member 109 which cooperates with a stationary thrust member 14 of any suitable form. The shell 110 of the steady bearing is within and below the elements of the thrust bearing and is suitably attached, as by bolts or screws 111, to a support 112, which is shown as inserted into an aperture 113 in the pot or housing 114 and suitably attached thereto as by bolts of screws 115. Support 112 is here shown as connected to or integrally formed with the ring 116 which receives the equalizing plates 16 for the stationary thrust bearing member, and one or more suitable passages 117 are formed therein to permit the oil to flow from the body of the oil in the well to the inner periphery of the stationary bearing member as heretofore described.

In this embodiment an auxiliary oil reservoir 118, of generally channel-shaped formation, is suitably attached, as by the bolts or screws 119, to the underside of the support 112, and the shell 110 has a depending flange 120 which carries viscosity pump ring 121, with which cooperates a flanged ring 122 suitably carried by the shaft 123, here shown as a hollow shaft with a solid shaft 124 interiorly thereof. The viscosity pump 121 raises the oil from the auxiliary oil reservoir 118 and delivers it through one or more passages 125 to the lower end of the steady bearing 126. The oil after passing through the steady bearing flows over the top of the oil retaining ring 127, suitably secured to the channel ring 116, and joins the body of oil circulating through the thrust bearing. The oil is returned to the auxiliary reservoir 118 from the main oil well through one or more suitable passages 128, shown as formed in the pot 114 and the support 112. In order that only cool oil shall overflow into the auxiliary reservoir 118, the passages 128 are shown as communicating with a riser pipe 129 which is surrounded by a second pipe 130 the interior of which communicates with the body of the oil in the well through apertures 131 in the bottom thereof. Hence only oil adjacent the bottom of the oil well, which has received the cooling action of the coil 132, can enter the pipe 130 and rise therein to overflow into the pipe 129 and thereby return through the passages 128 to the auxiliary reservoir 118.

In the form shown in Fig. 7 the steady bearing 126 is again positioned within and below the thrust bearing elements and is carried by a support 112 secured to the underside of the pot 114 and positioned within the aperture 113 thereof. In place of a viscosity pump, as in the embodiment of Fig. 6, the raising of the oil to the steady bearing 126 is effected by a rotating bowl 135 of any suitable construction, shown as retained on the shaft 123 by an annular nut 136 and provided with an overhanging flange 137. The shell 110 of the steady bearing is provided with a downwardly extending flange 138 which terminates in a radially extending flange 139 which projects into close proximity to the inner periphery of the outer wall of the bowl. Flange 139 has one or more inwardly directed passages 140 which communicate with one or more axial passages 141 in the flange 138, whereby the oil is led through one or more passages 142 to the steady bearing surfaces. The radial passages 140 thus take the oil from the inner periphery of the outer wall of the rotating bowl, where the oil is thrown by centrifugal force, and lead the same to the steady bearing surfaces by reason of the pressure generated by that force. After passing through the steady bearing the oil returns to the rotating bowl as in the embodiment of Fig. 6, the return passages in the support 112 and steady bearing shell 110 being shown at 143. Equalizing passages 144 are formed through the depending flange 138 of the steady bearing shell so that the pressure is equalized on the two sides of the same. To enable the bowl to be assembled after the flange 140 is in position, said bowl is preferably made in halves secured together in any suitable way.

Figure 7:
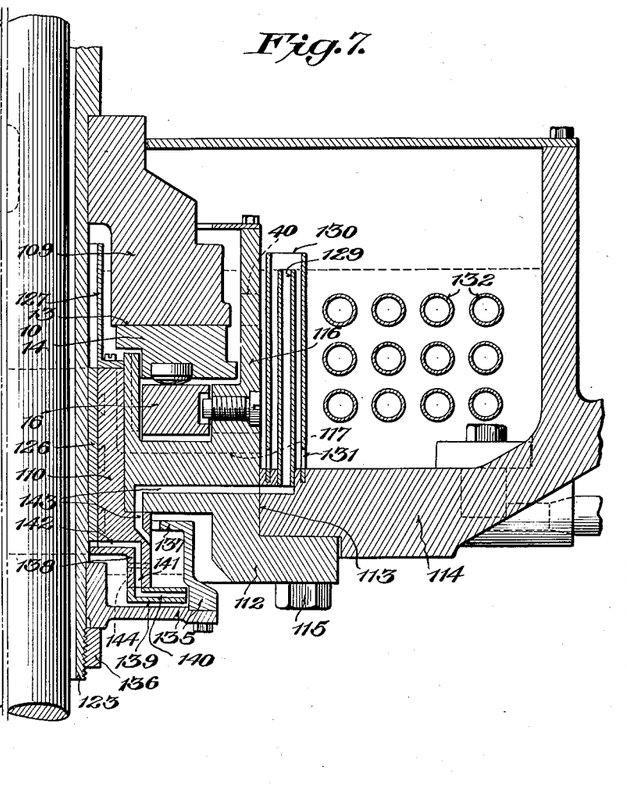
Fig. 7 is a half axial section of another embodiment of the present invention.

In place of riser pipes as illustrated in Figs. 6 and 7 the return of the oil to the auxiliary reservoir or bowl may be effected through one or more passages formed in the support 112, but preferably communicating with the main oil well adjacent the bottom thereof so as to assure that the oil overflowing into the auxiliary reservoir or bowl shall be taken from the coolest body of oil in the main reservoir.

Figure 8:
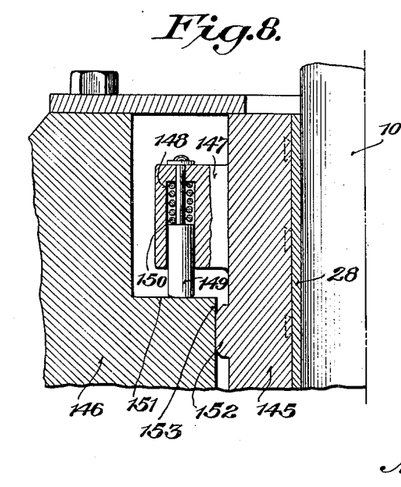
Fig. 8 is a fragmentary section of another construction providing self-alignment of the steady bearing and embodying the present invention.

Fig. 8 shows another manner of supporting the steady bearing shell 145 from its supporting sleeve 146. As here shown, the shell 145 is provided with a plurality of lugs 147 each of which is provided with a cylindrical recess 148 within which works a plunger 149. A coil spring 150 is interposed between said plunger and the bottom of said recess so that said plunger is normally urged outwardly into engagement with a surface or shoulder 151 on the support 146. Shell 145 also carries a peripheral rib or flange 152 having its peripheral surface curved or otherwise suitably shaped to engage and cooperate with the inner surface 153 of the aperture through the support 146. The shell 145 is thus elastically supported axially on the support 146 through the intermediary of the spring-pressed plungers 149, and said shell is self-aligning, the surface of engagement between the rib or flange 152 and the inner wall 153 of the aperture in the support 146 affording freedom for such movement of said shell as is necessary for it to align itself with the axis of the shaft. The springs 150 are selected of such size that they suitably support the weight of the shell 145 without becoming solid.

Figure 9:
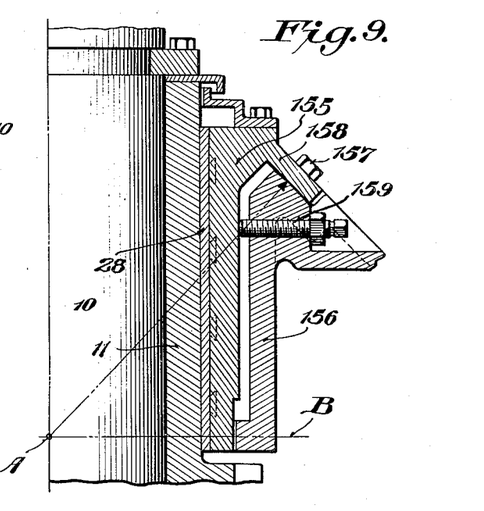
Fig. 9 is a fragmentary section of another construction for aligning the steady bearing and embodying the present invention.

In the form shown in Fig. 9 the steady bearing shell 155 is suitably attached to its support 156, as by bolts or screws 157, which pass through a neck or flange 158 on said shell which may or may not be elastic, and said support 156 also carries a plurality of adjusting screws 159 which may be tightened so as to enforce alignment of the steady bearing shell 155 with the axis of the shaft, the neck 158 providing sufficient elasticity to permit the shell to assume its proper position.

Figure 10:
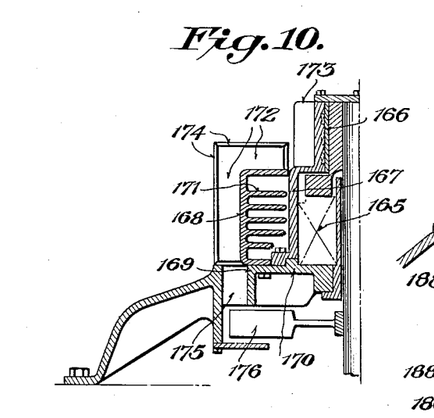
Fig. 10 is a schematic half section of another embodiment of the present invention employing air cooling.

In the embodiments so far illustrated, cooling coils have been provided for the oil but the present invention lends itself with equal facility to air cooling, if desired. Fig. 10 illustrates more or less diagrammatically an embodiment of this invention employing air cooling in a combined thrust and steady bearing of the type of construction illustrated in Figs. 1 to 5 inclusive. The thrust bearing is diagrammatically illustrated at 165 and the steady bearing at 166, the support for the latter being afforded by a generally cylindrical casing 167 of the type particularly illustrated in Fig. 1. The pot or oil well 168, shown as suitably attached, as by bolts or screws 169, to the deck 170, is provided with circumferential inwardly directed fins 171 for abstracting the heat from the oil within said pot and with radial axial outwardly directed fins 172 for dissipating the heat to the outside air in conformity with the principles disclosed in my Patent No. 1,584,174, granted May 11, 1926, for Air cooled thrust bearings. The sleeve of the steady bearing is also preferably provided with axially directed fins 173 in alignment with the fins 172, so as to prolong the air passages formed between said fins throughout the extent of the steady bearing as well as the walls of the pot for the thrust bearing. This construction enables a relatively light pot to be used; for example said pot with its interior and exterior fins may be constructed as a brass casting. If desired, the fins 172 may be embraced by a housing 174, which may be formed integrally therewith or suitably attached thereto, so as to enclose the air passages between said fins. The circulation of air through said passages may be caused by convection above, or as shown the deck or base 170 may be provided with passages 175 communicating with the lower end of the passages between said fins 172 and leading to a space below said deck in which is mounted a fan 176 suitably carried by the shaft and, by its rotation, inducing a rapid circulation of air through said air passages to abstract heat from the bearing parts. Air cooling may also be used with other embodiments of the invention as well as that illustrated.

Figure 11:
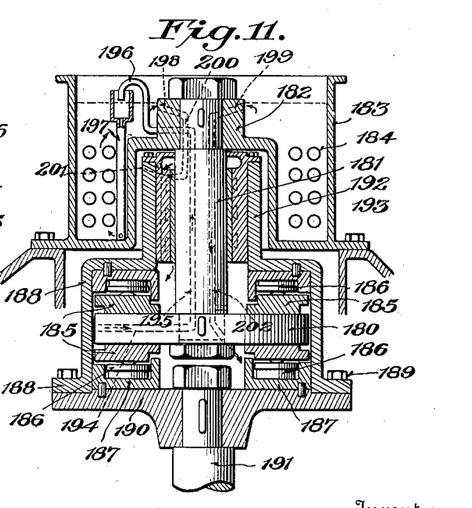
Fig. 11 is an axial section of another embodiment of the present invention employing a stationary thrust collar.

In Fig. 11 is shown an embodiment of the present invention employing a stationary thrust collar 180 carried by a stationary shaft 181 mounted on the base 182 of a pot or oil well 183 of any suitable construction and shown as including a cooling coil 184. The thrust bearing is here illustrated as a double acting bearing, although a single acting thrust could be employed if desired, and includes bearing members 185 of any suitable construction cooperating with opposed faces of the collar 180 and shown as shoes pivotally mounted on equalizing plates 186 carried by channel-shaped base rings 187 suitably secured to a casing 188. Casing 188 is suitably attached, as by bolts or screws 189, to a flange or head 190 suitably keyed or secured to the rotatable shaft 191. Hence the thrust bearing members 185, together with their supports and the casing 188 carrying the latter, rotate with the shaft. Casing 188 has an axial extension 192 which supports the steady bearing shell 193, and hence, as in the embodiments heretofore described, the steady bearing is supported in unitary relationship with the thrust bearing and its support is entirely independent of the size, shape and character of the pot 183.

As the casing 188 rotates with the shaft 191 the oil within the same is thrown radially outward, by centrifugal force, against the inner periphery of the outer wall of said casing. The periphery of the stationary thrust collar 180 is in close proximity to the inner wall of said casing and said thrust collar is provided with one or more inwardly directed passages 194 which lead from the periphery of said collar to axially extending passages 195 in the shaft 181. The latter passages communicate with passages 196 in the base 182 through which, and the pipes 197 which open into the oil well adjacent the bottom thereof, the oil is returned to the oil well. The oil rises through the cooling coil 184 and overflows into passages 198 and 199 formed in the base 182. The passage 198 communicates through a passage 200 with an oil groove 201 at the upper extremity of the steady bearing, while the passage 199 communicates with a passage 202 in the stationary shaft 181 leading to the chambers at the inner periphery of the thrust bearing members. Thence the oil delivered thereto flows outwardly under the action of centrifugal force, induced by the rotation of the thrust bearing members 185, to form the oil films and again create a pressure at the outer ends of the passages 194. Hence a continuous circulation of oil is maintained between the rotatable casing 188 for the thrust bearing members and the oil well 183, on the one hand, and between the oil well and the steady bearing, on the other hand, the oil which flows through the steady bearing joining the oil in casing 188. The rotation of the bearing members 185 and the housing 188 is productive of considerable pressure, generated by centrifugal force, at the inlet to the passages 194, and if desired this pressure may be utilized to cause the oil to circulate through any suitable cooling passages, or between baffle plates, as well as through an oil well containing a cooling oil as illustrated. This last embodiment permits a steady bearing of the smallest possible diameter to be used, a feature of very considerable importance in high speed bearings. The cooling of the bearing members may be additionally facilitated by providing the casing 188 with ribs so that air circulation generated by the rotation of said casing will assist in the dissipation of heat.

In the embodiments of the invention so far described, the shaft has been disposed vertically, but the invention is also applicable to horizontal bearings. Thus in the embodiment of Fig. 12 the shaft 205 is shown disposed horizontally and, while only a steady or journal bearing is shown in this figure, it is to be understood that it may be associated immediately with a thrust bearing; for example, the oil pot 206 is comparable to the oil pot 19 in the first embodiment described. The shell or sleeve 207 of the steady or journal bearing, comparable with the casing 22 of Fig. 1 for example, is shown as provided intermediate its length with opposed spherical surfaces 208 which contact with complementary surfaces 209 on the support 210 for said shell, the support being shown as taking the form of a pair of screws supported in any suitable way. This construction renders the steady or journal bearing self-aligning and may be used, for example, in place of the elastic neck 25 of the embodiment of Fig. 1, or the structure shown in Fig. 8, etc. The shell 207 may be made in halves, if desired.

In the embodiments of the invention employing steady bearings of the surface type heretofore described, the steady bearing has been shown as supplied with lubricant at or adjacent one end of the bearing surfaces and the oil has been fed axially between the bearing surfaces. The present invention also involves novel principles in the arrangement and character of oil grooves employed, and is applicable not only to steady bearings as heretofore described, but also to steady bearings of other constructions and to journal bearings generally.

Figure 12:
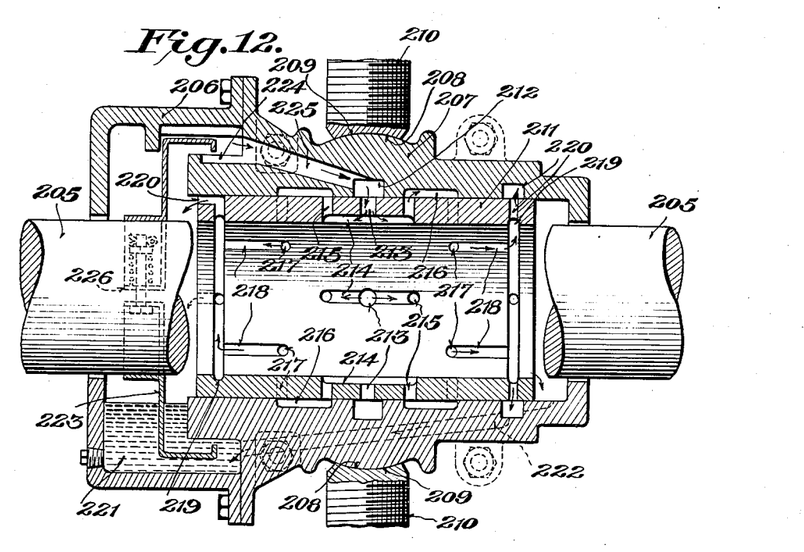
Fig. 12 is an axial section of a steady or journal bearing embodying the present invention and illustrating a novel arrangement of oil grooves.

Referring specifically to the embodiment illustrated in Fig. 12, shaft 205 cooperates with a stationary bearing member 211, which may be a journal brass or a Babbitt bushing or be of any other suitable construction. The oil is delivered to a circumferential groove or chamber 212 formed in the sleeve 207 or in the rear of the bushing 211, and flows therefrom through a plurality of circumferentially arranged apertures 213, disposed in a medial circumferential line, into a plurality of axially extending oil grooves 214 in the bearing face of the bushing 211. The oil flowing into the grooves 214 divides and flows in opposite directions toward the extremities of the bearing surfaces for a portion of the length thereof, here shown as approximately one-third of their length, and then flows outwardly through passages 215 into oil passages or chambers 216, formed in the sleeve 207 or in the bushing 211, which also lead toward the opposite extremities of the bearing surfaces. From the passages or chambers 216 the oil flows inwardly to the bearing surfaces through passages 217 and thence toward the opposite extremities of the bearing surfaces through grooves 218 formed in the stationary bearing surface. Said grooves 218 terminate in circumferential grooves 219 in the stationary bearing surface, disposed adjacent the opposite extremities thereof, from which the oil flows through passages 220 in the bushing 211 or shell 207 or both, returning to the oil reservoir 221. A passage 222 in the shell 207 is illustrated for conveying the oil from the remote groove 220 to the reservoir 221, and the near groove 220 is shown as discharging directly into said reservoir.

Thus, in this embodiment, the oil is delivered to the bearing surfaces at a medial circumferential line and flows in opposite directions to the extremities of the bearing surfaces, where the oil is collected in circumferential grooves 219 adjacent the extremities of the bearing surfaces. Moreover, the grooves 218 at each extremity of the bearing surfaces are of the same length as and in alignment with the corresponding grooves at the opposite extremity, and said grooves 218 are also in alignment with the medial lines between successive grooves 214, which latter grooves extend axially of the bearing surfaces to an equal extent on either side of the circumferential medial line and in alignment with the medial lines between the grooves 218. Therefore the oil grooves are symmetrically arranged with respect to the medial circumferential line of the bearing.

This disposition of the oil grooves effects a balance of the pressures in the oil films with respect to the medial circumferential line of the bearing surfaces. Thus when any given element of the bearing surface of the shaft is opposite a groove 214, where the oil pressure falls nearly to atmospheric, the shaft is supported at either side of the groove 214 by two oil films of equal size extending between the grooves 218 on the opposite sides of the axial line passing through the groove 214. When said element is opposite a pair of grooves 218, so that the oil pressure adjacent the extremities of this line drops nearly to atmospheric, the shaft is supported midway of the length of the bearing surfaces by an oil film extending between the pair of grooves 214 on either side of the line passing through the grooves 218, and this film extends equally on opposite sides of the medial circumferential line. This condition is true for every element of the bearing surface of the shaft and therefore the shaft is supported throughout its bearing surface by films which are balanced axially of the shaft with respect to the medial circumferential line, so that there is no tendency for unbalanced films to set the shaft into vibration. This is particularly important where the bearing is self-aligning so that the stationary bearing member has facility of movement and may be set into vibration by unbalanced oil film pressures.

The proper bearing action is further aided by the presence of the circumferential grooves 219 adjacent the opposite extremities of the bearing surfaces. These grooves are normally maintained full of oil and therefore act as air seals, preventing the admission of air into the films between the bearing surfaces, and therefore preventing the film being destroyed with the consequent lack of support of the shaft by an oil film pressure where such occurs. It is to be noted that all of the oil grooves of this embodiment extend axially of the shaft, and therefore they have no pumping action on the oil, but the quantity of oil flowing therethrough depends entirely upon the quantity and pressure of the source. With this arrangement there is no danger of the oil grooves pumping the oil out of the bearing surfaces more rapidly than it is delivered thereto. But the air sealing oil grooves at the extremities of the bearing surfaces may be employed with other arrangements of oil grooves, as hereinafter explained, including helical arrangements whereby the grooves effect a pumping action, and whether or not the oil grooves are so arranged as to give balanced films. In general, balanced films axially of the shaft are obtained when the oil grooves are symmetrically arranged with respect to a circumferential medial line so that every element of the shaft surface is acted upon by balanced moments of pressure, and with this limitation the oil grooves may be inclined to the axis or helical, so as to have a pumping action, or they may cross each other or be reverse helices, etc. On the other hand, a lack of symmetry results in a lack of balance in the oil films, and vibrations in the shaft may be set up. This may be taken advantage of to set up a predetermined vibration in the shaft which is different from the normal tendency of the shaft to vibrate at its own period or the period of vibration of the parts connected thereto, so as to effect a dampening action on the vibration of the shaft.

The oil may be delivered to the groove or chamber 212 in any suitable way as by the viscosity pumps of the structures heretofore disclosed. In the form shown in Fig. 12 the shaft 205 carries a channel-shaped oil collecting ring 223 which at its upper end overhangs the end of the sleeve 207, so that oil taken up by said ring from the reservoir 221 delivers the same to a groove or channel 224 which communicates with a passage 225 in the sleeve 207, leading to the groove or chamber 212. The channel-shaped oil collecting ring 223 is preferably made in halves which may be hinged together and clamped around the shaft 205 by any suitable lock or retaining means such as is diagrammatically illustrated at 226.

In the embodiment shown in Fig. 12 the oil is delivered to the bearing surfaces in a medial circumferential line, but this is not essential, as the oil may be delivered to the bearing surfaces at the sealing groove at one extremity of the bearing surfaces as in the embodiments previously described, and be caused to flow lengthwise of the bearing surfaces, discharging through the opposite oil sealing groove. When this arrangement is employed the support for the steady bearing may be placed nearer the end where the cool oil enters than the opposite end, because as the oil passes between the bearing surfaces it becomes heated and thinner, and therefore the moments of the films at the hotter end of the bearing should have longer moment arms than the films at the cooler end of the bearing. In any event the support for the steady bearing, where the latter is made self-aligning, will be in the plane of the resultant of the pressures on the films existing between the bearing surfaces.

Figure 13:
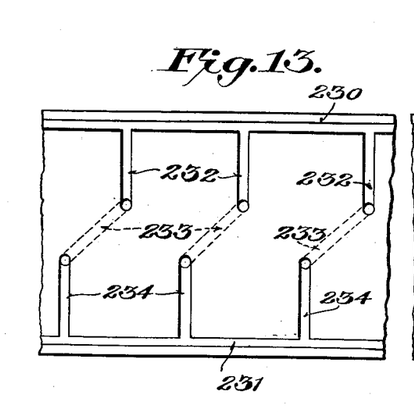
Figs. 13 and 14 are diagrammatic views illustrating other arrangements of oil grooves in circumferential development and embodying the present invention.
Figure 14:
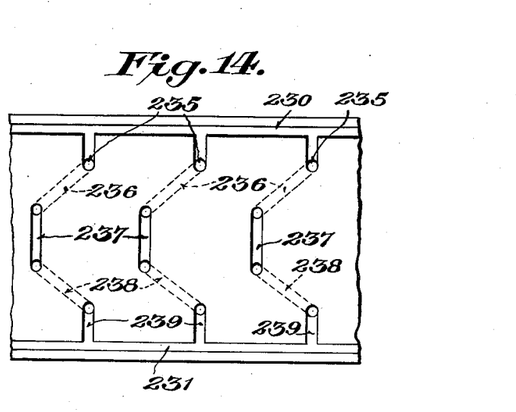

Figs. 13 and 14 show, in circumferential development, two arrangements of grooving embodying the present invention and employing air sealing grooves 230 and 231 adjacent the opposite extremities of the bearing surfaces. In the form shown in Fig. 13 the grooving is so arranged that the films are not symmetrical axially of the bearing, and this is suitable for use where the steady bearing is mounted rigidly without provision for self-alignment. In the form shown in Fig. 14 the grooves are shown symmetrical axially of the bearing, and this arrangement is suitable where the steady bearing is mounted with provision for self-alignment.

In Fig. 13, assuming that the oil is delivered to the groove 230, it flows axially of the bearing surface through grooves 232 in the bearing surface, then through passages 233 at the rear of the bearing surfaces, and then through grooves 234 in the bearing surface, the latter grooves delivering to the air sealing groove 231. In this arrangement an element of the bearing surface of the shaft when opposite one of the grooves 232 is substantially unsupported adjacent one end of the bearing surface, while at the opposite end of the bearing surface it is supported by the oil film between the pair of grooves 234 on either side of said groove 232. When said element is opposite one of the grooves 234 the conditions are reversed, and the element is substantially unsupported at the latter end of the bearing surfaces while it is supported by a film extending between two of the grooves 232 at the former end of the bearing surfaces. Hence there is a periodic increase and decrease of pressure adjacent the opposite extremities of the bearing surfaces, the periodicities at the two ends of the bearing surface being 180° out of phase, so that the shaft tends to be set into vibration.

In the form shown in Fig. 14, assuming the oil is delivered to the groove 230, it first flows axially of the shaft through grooves 235 in the bearing surface, then through passages 236 at the rear of the bearing surfaces, then through the grooves 237 in the bearing surface disposed midway between the grooves 230 and 231, then through passages 238 at the rear of the bearing surfaces, and then through grooves 239 in the bearing surface in alignment with and of equal length to the passages 235, the latter grooves 239 delivering to the groove 231. In this construction the oil films are balanced with respect to the medial circumferential line of the bearing surfaces because of the symmetrical arrangement of the oil grooves, the relation of the oil films being the same as that described in conjunction with Fig. 12 except that the oil is flowing from one extremity of the bearing surfaces to the other instead of being delivered midway of the length of the bearing surfaces.

The number of grooves around the bearing surface in a circumferential direction may be varied in conformity with the character of film action desired. In general it is desirable to arrange the grooves symmetrically around the shaft circumferentially, and the number of systems of similar grooves in a circumferential direction determines the tendency of the shaft to vibrate. For example, if there are four systems of similar grooves around the circumference of the bearing there is a periodic change in the pressure of the film opposite any given element of the bearing surface of the shaft four times in each revolution and, depending upon the speed of rotation of the shaft, there is a tendency of the shaft to vibrate at the period so determined. This periodicity can be increased or decreased in increasing or decreasing the number of systems of grooves and thereby synchronization of the natural period of the shaft and the parts which it carries with the period which the films tend to set up can be avoided, and this may be taken advantage of in dampening the vibratory action of the shaft under the action of the machinery connected thereto.

Figure 15:
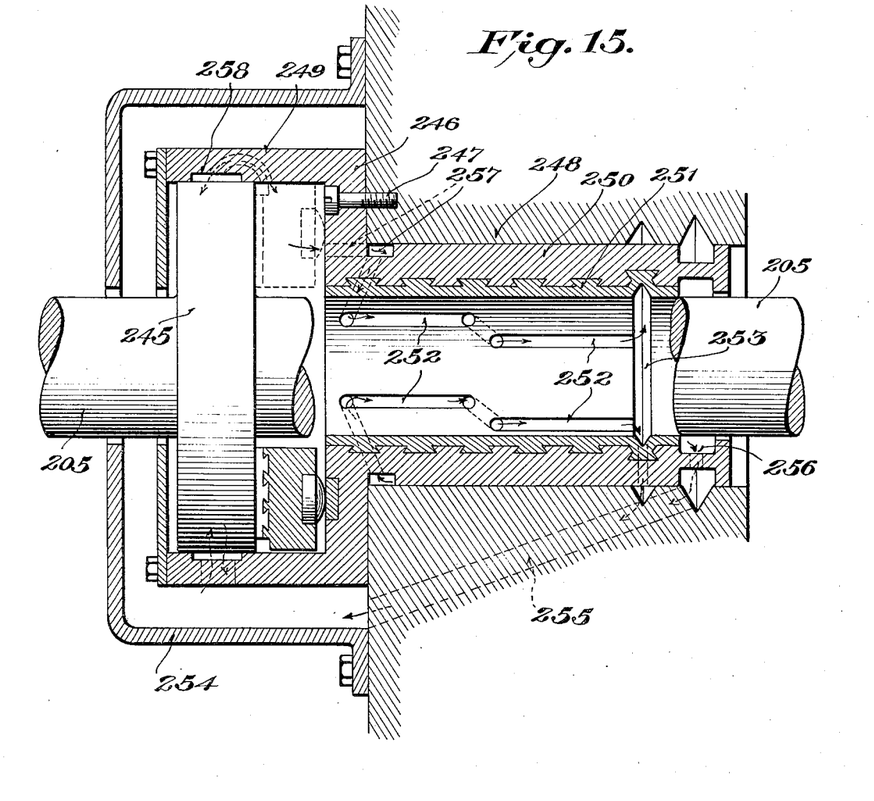
Fig. 15 is a schematic section showing another embodiment of this invention.

Fig. 15 shows more or less schematically another combined thrust and steady bearing, embodying the present invention, for use in conjunction with horizontal or inclined shafts, and in some respects is similar to the embodiment of Fig. 12, although perhaps a more direct comparison may be drawn with the embodiment of Fig. 4. In this embodiment the shaft 205 is provided with a thrust collar 245 with which cooperates stationary thrust bearing elements shown more or less diagrammatically. While the bearing has been shown as a single acting thrust bearing, it may with equal facility be a double acting thrust bearing. Surrounding the thrust bearing elements and the shaft 205 is a casing 246, comparable to the casing 22 of Fig. 1 or the composite structure 22, 76 of Fig. 4 if the latter were made in one piece. Casing 246 is secured in any suitable way, as by machine screws 247, to the base or foundation 248, and not only affords a housing for the thrust bearing elements at its portion 249 of larger diameter, but also constitutes a casing 250 for the journal bearing at its portion of smaller diameter, where it is shown as provided with a Babbitt lining 251 containing oil grooves 252 of the character disclosed in the preceding figures. Said grooves 252 communicate with an air-sealing oil groove 253 adjacent the outer extremity of the journal bearing surfaces, and the oil is returned from said groove 253 to the body of oil in the oil pot 254, also carried by the base or foundation 248, through one or more suitable grooves 255 in said base or foundation. An oil collecting groove 256 is also shown as communicating with the passages 255. Oil is supplied to the journal bearing surfaces from the space containing the thrust bearing elements through one or more suitable passages 257 in the casing 246, which passages communicate with the oil grooves 252 at one extremity and with the chamber containing the thrust bearing elements at the other extremity. The oil may be supplied to the chamber containing the thrust bearing elements in any suitable way, as by a viscosity pump 258, coacting with the periphery of the thrust collar 245. If desired, the viscosity pump may be so constructed as to collect and feed oil to the bearing surfaces for either direction of the rotation of shaft 205.

It will therefore be perceived that a combined thrust and steady bearing has been provided wherein the support for the steady bearing is entirely independent of the size and shape of the pot or bearing housing, but may be determined by the size of the thrust bearing, so that the support for the steady bearing may be standardized and the steady bearing and the thrust bearing may be furnished as a unit. Moreover, the steady bearing may be made self-aligning and lubricated by oil supplied from the thrust bearing as desired, and the steady bearing may be made self-aligning in various ways, while the lubrication of the steady bearing may be effected in various ways and by means variously disposed with respect to the bearing elements. The steady bearing, either with or without the lubricating features heretofore disclosed, may be disposed either above or below the thrust bearing and may take the form of a ball bearing or other forms of anti-friction bearing as well as a surface bearing. The invention may also be embodied in structures wherein the thrust collar is rotatable or stationary, and wherein the shaft is either horizontal or vertical or inclined, and whether it is solid or hollow. Additionally, the invention may be embodied in conjunction with air cooling as well as water cooling of the lubricant. Provision may also be made to insure a capillary film of oil between the surfaces of the steady bearing when the parts are at rest and the main oil level below the lower end of the steady bearing. Provision has also been made to prevent the drawing of air into the oil films, and to maintain the desired balance of the oil films, and to prevent or control or predetermine or dampen the vibratory action of the shaft, and these features may be embodied in various forms of journal bearings as well as in steady bearings. Additionally, these features may be combined in various ways to secure the desired results.

While a number of embodiments of the invention have been shown and described in detail, it is to be expressly understood that the illustrated embodiments are not exclusive, as various other embodiments will now readily suggest themselves to those skilled in the art, while changes may be made in the details of construction, arrangement and proportion of parts, and certain features used, without other features, without departing from the spirit of this invention. Features shown only in conjunction with one embodiment may be combined with features shown in other embodiments, and various features may be used independently, all of which will be readily apparent to those skilled in the art. Reference is therefore to be had to the claims hereto appended for a definition of the limits of the invention.

What is claimed is:

1. In a combined thrust and steady bearing for a shaft provided with relatively rotatable thrust and steady bearing members, in combination with a pot or housing for the thrust bearing, a support for the stationary bearing member of the steady bearing mounted on the base of said pot or housing.

2. In a combined thrust and steady bearing for a shaft provided with relatively rotatable thrust and steady bearing members, in combination with a pot or housing for the thrust bearing, a support for the stationary bearing member of the steady bearing mounted on the base of said pot or housing as a unit with the thrust bearing members, said support being independent of the size or shape of said pot or housing.

3. In a combined thrust and steady bearing for a shaft provided with relatively rotatable thrust and steady bearing members, in combination with a pot or housing for the thrust bearing, a support for the stationary bearing member of the steady bearing mounted in said pot or housing and closely surrounding the members of the thrust bearing.

4. In a combined thrust and steady bearing for a shaft provided with relatively rotatable thrust and steady bearing members, in combination with an oil well, a support for the thrust bearing mounted in said oil well, and a support for the stationary bearing member of the steady bearing mounted in said oil well and interposed between the thrust bearing members and the body of oil in said well.

5. In a combined thrust and steady bearing for a shaft provided with relatively rotatable thrust and steady bearing members, in combination with a pot or housing for the thrust bearing, an inner housing for the thrust bearing members mounted in said pot or housing, said inner housing acting as a support for the stationary bearing member of the steady bearing.

6. In a combined thrust and steady bearing for a shaft provided with relatively rotatable thrust and steady bearing members, in combination with a pot or housing for the thrust bearing, a member mounted on the base of said pot or housing coaxially with the thrust bearing members, and a support or shell for the stationary bearing member of the steady bearing mounted on said member.

7. In a combined thrust and steady bearing for a shaft provided with relatively rotatable thrust and steady bearing members, in combination with a pot or housing for the thrust bearing, a member surrounding the thrust bearing members and mounted in said pot or housing, said member providing for the circulation of oil to and from said thrust bearing members, and a support or shell for the stationary bearing member of said steady bearing mounted on said member.

8. In a combined thrust and steady bearing for a shaft provided with relatively rotatable thrust and steady bearing members, in combination with a pot or housing for the thrust bearing, a support for the stationary bearing member of the steady bearing mounted on the base of said pot or housing and including means whereby said steady bearing is self-aligning.

9. In a combined thrust and steady bearing for a shaft provided with relatively rotatable thrust and steady bearing members, in combination with a pot or housing for the thrust bearing, a support for the stationary bearing member of the steady bearing mounted on the base of said pot or housing, said support including elastic means whereby said steady bearing may align itself with the axis of the shaft.

10. In a combined thrust and steady bearing for a shaft provided with relatively rotatable thrust and steady bearing members, in combination with a pot or housing for the thrust bearing, a support for the stationary bearing member of the steady bearing mounted in said pot or housing, said support including a member which surrounds the thrust bearing members and means intermediate said member and the stationary member of the steady bearing whereby the latter may tilt with respect to the former.

11. In a combined thrust and steady bearing for a shaft provided with relatively rotatable thrust and steady bearing members, in combination with a pot or housing for the thrust bearing, a support for the stationary bearing member of the steady bearing mounted in said pot or housing, said support including a member surrounding the thrust bearing members and elastic means between said member and the stationary member of the steady bearing whereby the latter may tilt with respect to the former.

12. In a combined thrust and steady bearing for a shaft provided with relatively rotatable thrust and steady bearing members, in combination with a pot or housing for the thrust bearing, a support for the stationary bearing member of the steady bearing mounted in said pot or housing, said support including a member which surrounds the thrust bearing members and elastic means extending angularly of the shaft and connecting the stationary member of the steady bearing with said supporting member.

13. In a combined thrust and steady bearing for a shaft provided with relatively rotatable thrust and steady bearing members, in combination with a pot or housing for the thrust bearing, a support for the stationary bearing member of the steady bearing mounted in said pot or housing, said support including a member surrounding the thrust bearing members, a shell for the stationary member of the steady bearing and means intermediate said member and shell whereby said shell may tilt with respect to said member.

14. In a combined thrust and steady bearing for a shaft provided with relatively rotatable thrust and steady bearing members, in combination with a pot or housing, a support for the thrust bearing mounted in said pot or housing, a support for the stationary bearing member of the steady bearing mounted on the base of said pot or housing, and means for feeding oil to the steady bearing from said pot or housing.

15. In a combined thrust and steady bearing for a shaft provided with relatively rotatable thrust and steady bearing members, in combination with a pot or housing, a support for the thrust bearing and a support for the stationary bearing member of the steady bearing both mounted on the base of said pot or housing, and means operated by the relative movement of the bearing members for feeding oil to the bearing surfaces of the steady bearing.

16. In a combined thrust and steady bearing for a shaft provided with relatively rotatable thrust and steady bearing members, in combination with a pot or housing, a support for the thrust bearing and a support for the stationary bearing member of the steady bearing both mounted on the base of said pot or housing, means for feeding oil to the bearing surfaces of the steady bearing, and passages in said supports for conveying oil from said pot or housing to said feeding means.

17. In a combined thrust and steady bearing for a shaft provided with relatively rotatable thrust and steady bearing members, in combination with a pot or housing, a support for the thrust bearing and a support for the stationary bearing member of the steady bearing both mounted on the base of said pot or housing, means for feeding oil to the bearing surfaces of the steady bearing, and passages in said supports for returning the oil from the steady bearing to said pot or housing.

18. In a combined thrust and steady bearing for a shaft provided with relatively rotatable thrust and steady bearing members, in combination with a pot or housing, a support for the thrust bearing and a support for the stationary bearing member of the steady bearing both mounted on the base of said pot or housing, and means for feeding oil from said pot or housing to the steady bearing provided with inlet passages communicating with said pot or housing adjacent the base thereof.

19. In a combined thrust and steady bearing for a shaft provided with relatively rotatable thrust and steady bearing members, in combination with a pot or housing, a support for the thrust bearing and a support for the stationary bearing member of the steady bearing both mounted in said pot or housing, and means cooperating with the periphery of the rotatable thrust member for feeding oil from said pot or reservoir to the steady bearing.

20. In a combined thrust and steady bearing for a shaft provided with relatively rotatable thrust and steady bearing members, in combination with a pot or housing for the thrust bearing, a support for the stationary bearing member of the steady bearing mounted in said pot or housing, means cooperating with the periphery of the rotatable bearing member for feeding oil from said pot or housing to the steady bearing, and passages in said support communicating with said last-named means.

21. In a combined thrust and steady bearing for a shaft provided with relatively rotatable thrust and steady bearing members, in combination with a pot or housing for the thrust bearing, a support for the stationary bearing member of the steady bearing surrounding the thrust bearing members and mounted on the base of said pot or housing, and means on said base for centering said support thereon.

22. In a combined thrust and steady bearing for a shaft provided with relatively rotatable thrust and steady bearing members, in combination with a pot or housing, a support for the thrust bearing and a support for the stationary bearing member of the steady bearing both mounted on the base of said pot or housing, and means carried by said steady bearing support for feeding oil to the steady bearing.

23. In a combined thrust and steady bearing for a shaft provided with relatively rotatable thrust and steady bearing members, in combination with a pot or housing for the thrust bearing, a support for the stationary bearing member of the steady bearing mounted on the base of said pot or housing, and elastic means between said support and the stationary members of a steady bearing, said support and stationary members cooperating to permit the latter to tilt by flexure of said means.

24. In a combined thrust and steady bearing for a shaft provided with relatively rotatable thrust and steady bearing members, in combination with a pot or housing enclosing the thrust bearing, a support for the stationary bearing member of the steady bearing, a shell for the stationary member of the steady bearing, and an elastic ring interposed between said support and said shell.

25. In a combined thrust and steady bearing for a shaft provided with relatively rotatable thrust and steady bearing members, in combination with a pot or housing for the thrust bearing, a support for the stationary bearing member of the steady bearing mounted on said pot or housing, a shell for said member, and elastic means interposed between said support and said shell.

26. In a combined thrust and steady bearing for a shaft provided with relatively rotatable thrust and steady bearing members, in combination with a pot or housing for the thrust bearing, a support for the stationary bearing member of the steady bearing mounted on said pot or housing, a shell for said stationary member, and elastic means interposed between and integral with said support and said shell, said means between said support and shell effecting alignment of said steady bearing with the axis of the shaft.

27. In a combined thrust and steady bearing for a shaft provided with relatively rotatable thrust and steady bearing members, in combination with a pot or housing for the thrust bearing, a support for the stationary bearing member of the steady bearing mounted on said pot or housing, a shell for said stationary member, and elastic means interposed between said shell and support, said shell and support permitting relative movement thereof.

28. In a combined thrust and steady bearing for a shaft comprising fixed and rotatable bearing members, an annular lubricant reservoir through which the shaft extends, and means for mounting the stationary bearing members on the base of said reservoir and spaced from the walls thereof.

29. In a combined thrust and steady bearing for a shaft comprising fixed and rotatable bearing members, an annular lubricant reservoir through which the shaft extends, means for mounting the stationary thrust bearing member on the base of said reservoir in proximity to the inner wall thereof, and means closely surrounding the thrust bearing for mounting the stationary steady bearing member on the base of said reservoir.

30. In a combined thrust and steady bearing for a shaft comprising fixed and rotatable bearing members, an annular lubricant reservoir through which the shaft extends, means for mounting the stationary thrust bearing member on the base of said reservoir in proximity to the inner wall thereof, means surrounding the thrust bearing for mounting the stationary steady bearing member on the base of said reservoir, and viscosity pump means for supplying lubricant to the steady bearing members.

In testimony whereof I have signed this specification.

HARRY A. S. HOWARTH.